United States Patent [19]

Shioura et al.

[11] Patent Number: 4,698,083
[45] Date of Patent: Oct. 6, 1987

[54] METHOD FOR PRODUCING GLASS FIBERS HAVING NON-CIRCULAR CROSS SECTIONS

[75] Inventors: Kozo Shioura; Syuichi Yamazaki; Hiroaki Shono, all of Fukushima, Japan

[73] Assignee: Nitto Boseki Co., Ltd., Fukushima, Japan

[21] Appl. No.: 842,491

[22] Filed: Mar. 21, 1986

[30] Foreign Application Priority Data

Mar. 23, 1985 [JP] Japan .................................. 60-57535
Mar. 23, 1985 [JP] Japan .................................. 60-57536
Feb. 14, 1986 [JP] Japan .................................. 61-28938

[51] Int. Cl.⁴ .......................................... C03B 37/022
[52] U.S. Cl. .................................. 65/2; 65/1; 65/12; 264/177.13; 425/76; 425/463; 428/399
[58] Field of Search ................ 65/1, 2, 12; 428/397, 428/399; 425/76, 463; 264/177.13

[56] References Cited

U.S. PATENT DOCUMENTS

| | | | |
|---|---|---|---|
| 3,357,048 | 12/1967 | Cobb ........................... | 264/177.13 X |
| 3,600,491 | 8/1971 | Shimoda et al. ................ | 428/397 X |
| 4,349,604 | 9/1982 | Blackmon et al. .............. | 428/397 X |
| 4,376,743 | 3/1983 | Dees ........................... | 264/177.13 X |
| 4,411,852 | 10/1983 | Bromley ...................... | 264/177.13 X |
| 4,437,869 | 3/1984 | Lecron et al. . | |
| 4,473,386 | 9/1984 | Strickland .................... | 65/2 X |
| 4,620,859 | 11/1986 | Lin et al. .................... | 65/2 |
| 4,622,054 | 11/1986 | Huey et al. ................... | 65/2 |

FOREIGN PATENT DOCUMENTS 0029779 3/1981 European Pat. Off. .
0078602 11/1983 European Pat. Off. .
0069601 12/1983 European Pat. Off. .
1341710 9/1963 France .

OTHER PUBLICATIONS

R. A. Humphrey, "Forming Glass Filaments with Unusual Cross Sections", pp. 77.1–77.8.
"The Way Leading to Glass Fibers in the Next Generation", pp. 334–338.

Primary Examiner—Robert L. Lindsay
Attorney, Agent, or Firm—Bert J. Lewen; Henry Sternberg

[57] ABSTRACT

A method of producing a glass fiber strand in which a plurality of molten glass filaments spun from adjacent nozzle ports in a nozzle plate are adjoined to one another so as to form a single glass fiber having a non-circular cross-sectional shapes such as oval, elliptic, cocoon-shaped and polygonal shapes. The method can employ a nozzle plate provided in the underside thereof with a plurality of recesses in each of which a plurality of nozzle ports are opened, so that the molten glass filaments from these nozzle ports are adjoined to each other so as to form the single glass fiber having a non-circular cross-section.

20 Claims, 23 Drawing Figures

METHOD FOR PRODUCING GLASS FIBERS HAVING NON-CIRCULAR CROSS SECTIONS

BACKGROUND OF THE INVENTION

1. Field of the Invention

The present invention relates to a strand comprising a multiplicity of glass fibers having a non-circular cross-section such as oval, elliptic, cocoon-shaped or a polygonal cross-section, as well as a method of producing such a strand.

2. Description of the Prior Art

In general, glass fibers are formed by spinning a multiplicity of filaments of molten glass from a bushing having numerous nozzle ports of a circular cross-section, gathering the filaments and taking up these filaments as a strand. Thus, each filament of the glass fiber has a circular cross-section. The glass fibers are used mainly as reinforcers mixed with a thermosetting resin or a thermoplastic resin. In general, a treating agent is applied to the surface of the glass fiber so as to produce a bonding force at the boundary surface between the glass and the resin.

In recent years, there is an increasing demand for higher strength of composite materials containing a resin and glass fibers. In fact, long glass fibers which are used in filament winding, pultrusion, roving cloth, electric insulating cloth and so forth are required to be formed into a strand having reduced thickness.

The present inventors have conducted an intense study to cope with such a demand and have found that enhancement of the bonding strength between the glass fibers and the resin is an important factor for attaining a high strength of the composite material. The inventors have found also that higher bonding strength is obtainable when the glass fibers have non-circular cross-sections such as oval, elliptic, cocoon-shaped or polygonal cross-sectional shape, as compared with the case where the glass fibers have a circular cross-section. This may be attributable to a fact that the glass fibers having non-circular cross-sections have specific surface areas greater than those of the glass fibers of a circular cross-section, so that they produce a greater bonding strength and, hence, a greater reinforcement effect. It has been confirmed also that, when the glass fibers have such a cross-section that the outer periphery is recessed inwardly, adjacent fibers are received by recesses of the adjacent glass fibers so as to resist any force which acts to separate the adjacent fibers from each other. The inventors have found also that, when the glass fibers have a comparatively flat cross-section such as an elliptic or cocoon-shaped form, the flat glass fibers are superposed so as to realize thin strands of the glass fibers. Unfortunately, however, it is very difficult to form glass fibers having non-circular cross-section. Namely, since the molten glass coming out the nozzle port has a low viscosity and, hence, a large surface tension at high temperature, the molten glass filament from the nozzle tends to have a circular cross-section even if each nozzle port has a non-circular cross-section. It is, therefore, impossible to obtain glass fibers having desired non-circular cross-sections.

SUMMARY OF THE INVENTION

Accordingly, an object of the invention is to provide a strand comprising glass fibers each having a non-circular cross-section and capable of enhancing the strength of a composite material consisting of a resin and glass fibers, i.e., glass fiber-reinforced plastic.

To this end, according to one aspect of the invention, there is provided a strand comprising glass fibers the cross-section of each said glass fiber having at least two expanded apex portions and a recess provided on each side extending between adjacent said apex portions.

The invention provides also a method of producing glass fiber strand having the steps of spinning a plurality of element glass filaments from a plurality of nozzle ports arranged in close proximity of one another, adjoining the element glass filaments into a single filament, gathering said glass fibers into a strand, and winding up said strand.

According to this method, in which the element glass filaments spun from a plurality of nozzle ports are adjoined into a single filament, when the element filaments are adjoined, the glass temperature has been lowered considerably and, hence, the viscosity has been increased to such a level as to reduce the surface tension. In consequence, the tendency of the glass to deform into circular cross-section is suppressed as compared with the case where the filaments spun from oval, elliptic or other non-circular nozzle ports are used without adjoining. It is, therefore, possible to obtain glass fibers having a non-circular cross-section such as oval, elliptic, cocoon-shaped and polygonal cross-sections.

The method of the invention may employ the above-described spinning device constituted by a nozzle plate having a flat plate provided with a multiplicity of nozzle ports. However, it proved that this spinning device suffers from the following problems. Namely, when one of the element glass filament under spinning is cut due to, for example, existence of foreign matter in molten glass, the molten glass flows laterally in contact with the surface of the nozzle plate because of the interfacial tension between the glass and the nozzle plate. This flow of molten glass undesirably cuts other filaments to hinder the spinning. Once such a state occurs, it is necessary to conduct a troublesome work for pulling and arraying a multiplicity of cut filaments by a special tool similar to a pincette. This work requires impractically long time and much labour. For producing glass fibers of a non-circular cross-section, it is preferred that the element glass filaments spun from the nozzle ports have a considerably high viscosity, i.e., a low temperature. To this end, it is desirable that the temperature in the spinning furnace is maintained at a comparatively low level. In consequence, the temperature of the glass in the liquid phase maintained in the furnace approaches the spinning temperature, often allowing a devitrification in the regions near the corners of the furnace.

Therefore, another object of the invention is to provide a method of producing glass fibers having a non-circular cross-section, which permits an easy arraying of the element glass filaments at the time of starting of the spinning or after accidental cutting of the filaments and which can reduce the devitrification tendency of the glass.

To this end, a preferred embodiment of the method in accordance with the invention employs a nozzle plate which is provided with a plurality of tips in the lower surface thereof, each tip having therein a plurality of nozzle ports. The element glass filaments spun from the nozzle ports of the same tip are adjoined into a single filament.

According to this method, a plurality of nozzle ports for forming a single glass fiber of a non-circular cross-section are formed within each of a plurality of tips provided on the lower surface of the nozzle plate. Therefore, even when one of the element glass filament is cut accidentally, the molten glass of this filament does not flow laterally beyond the tip to which it belongs. Rather, the glass flows downwardly due to the force of gravity. Therefore, the undesirable cutting of other filaments is avoided and the time and labor for arraying the filaments are saved. In addition, it is possible to adjust the viscosity such that a desired viscosity, i.e., a desired temperature, is obtained at the end of the tip. This in turn allows the temperature of the glass in the furnace to be maintained at a considerably high level, for example at a temperature higher than the spinning temperature by 50°-60° C., thus eliminating the risk of devitrification of the glass material in the furnace.

The above and other objects, features and advantages of the invention will become clear from the following; description of the preferred embodiments when the same is read in conjunction with the accompanying drawings.

DESCRIPTION OF THE PREFERRED EMBODIMENTS

Figure 1A:
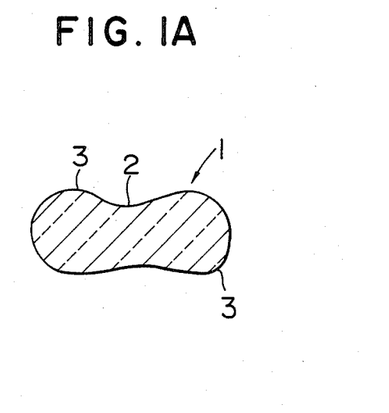
FIGS. 1A and 1B are cross-sectional views of embodiments of a glass fiber in accordance with the invention, having a cocoon-shaped cross-section and a basically triangular cross-section, respectively.
Figure 1B:
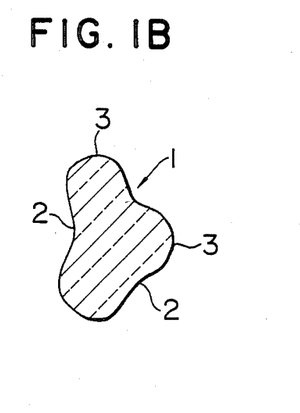

FIGS. 1A and 1B show preferred embodiments of the glass fiber in accordance with the invention. The glass fiber 1 shown in FIG. 1A has a cocoon-shaped cross-section having expanded end portions 3 and a contracted central portion providing recesses 2. The glass fiber 1 shown in FIG. 1B has a substantially triangular cross-section with expanded apices 3 and recesses 2 formed between adjacent apices. These cross-sectional shapes are not exclusive and any other polygonal cross-section such as square, pentagonal and so forth are equally adoptable provided that recesses are formed between adjacent apices.

The glass fiber having a cross-section with recesses 2 in its periphery provides greater specific area as compared with known fibers having circular cross-section, so that it exhibits a greater strength of bonding to the resin than the conventional glass fiber, thus assuring a greater reinforcing effect.

A plurality of glass fibers of the invention having a non-circular cross-section can be gathered into a strand by a known process which employs a sizing agent application roller and guides along which the glass fibers run in a tensed state. During the gathering process, all the glass fibers are held in close contact with one another, so that the expanded portions 3 of these glass fibers are received in the recesses 2 of adjacent glass fibers, thus assuring higher adhesion of adjacent glass fibers in the product strand. This provides an easier handling of the strand and, when the strands are mixed in a plastic for the purpose of reinforcement, provides a greater tearing strength of the reinforced plastic because the adjacent glass fibers in each strand exhibits a large bonding strength against the force which acts in the direction perpendicular to the axes of the glass fibers.

Figure 2:
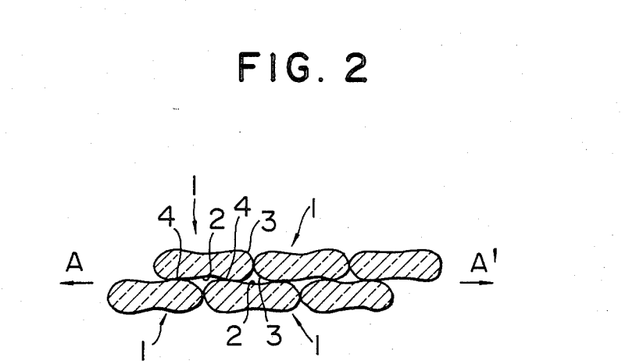
FIG. 2 is a sectional view of a strand constituted by a plurality of glass fibers shown in FIG. 1A.

FIG. 2 shows an example of the strand formed from glass fibers shown in FIG. 1A having a cocoon-shaped cross-section. As will be seen from this Figure, the glass fibers are superposed on one another such that the expanded portions 3 are received in the recesses 2 of adjacent glass fibers so that the strand generally has a flattened cross-section and adjacent glass fibers 1 and 1 produce retain each other at their portions where they engage each other as at 4, thus exhibiting a large bonding force in the direction of arrows A—A' between adjacent glass fibers, thus improving the tearing strength of the composite material. The greater the depth of the recess 2 is, the greater the tearing strength becomes.

The strand produced from the glass fibers of the invention is particularly suitable in the formation of a pultrusion which requires a large strength against cracking in the direction perpendicular to the direction of axis.

The strand formed from the cocoon cross-sectioned glass fibers shown in FIG. 1A is generally flat and thin as compared with the conventional strand formed from known circular cross-sectioned glass fibers, because the expanded portions and the recesses of adjacent fibers fit each other. This strand, therefore, can be used suitably as a long strand for the purpose of, for example, filament winding, pultrusion, roving cloth and electric insulating cloth.

Figure 3:
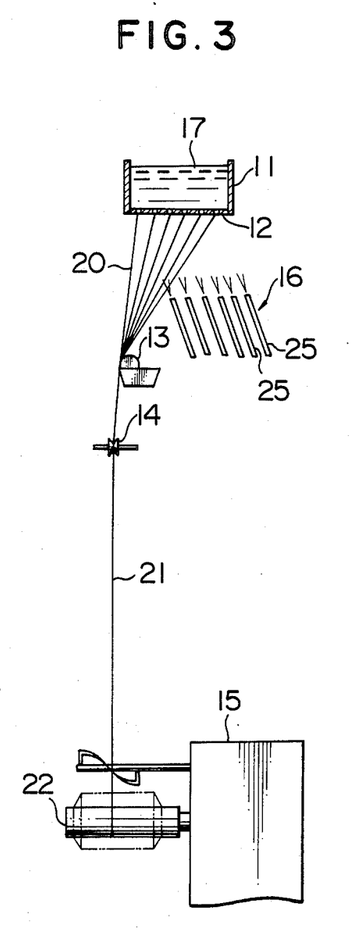
FIG. 3 is a schematic side elevational view of an example of an apparatus suitable for use in carrying out the invention.
Figure 4:
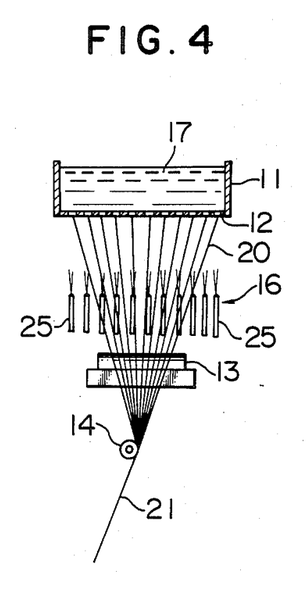
FIG. 4 is a front elevational view of the apparatus shown in FIG. 3.

FIG. 3 is a schematic side elevational view of an apparatus for producing a glass fiber of the invention having a non-circular cross-section, while FIG. 4 is a front elevational view of an essential portion of the apparatus. The apparatus has a bushing 11 having a bottom nozzle plate 12 provided with a multiplicity of nozzle ports. The apparatus also has a sizing agent application rollers 13, a gathering roller 14, a take-up device 15, a cooling gas blowing device 16, and so forth. As will be seen from FIG. 5, the nozzle plate 12 has a multiplicity of pairs of nozzle ports 18A, 18B and, as will be best seen from FIG. 6, the lower surface of the nozzle plate 12 is provided with a plurality of conical or spherical recesses 19 in each of which are formed the pair of nozzle ports 18A, 18B such that the sphere or the cone is centered at the mid point between the pair of nozzle ports 18A, 18B.

Referring to FIGS. 3 and 4, the molten glass 17 supplied to the bushing 11 is spun from the pair of nozzle ports 18A, 18B in each recess 19 of the nozzle plate 12 and are adjoined to each other while being blown by the cooling gas from the cooling gas blowing device 16, so that they are rapidly cooled and solidified to become a glass fiber 20 having a non-circular cross-section such as elliptic, oval or cocoon-shaped cross-section. A sizing agent is applied to the thus formed glass fibers and the glass fibers are gathered into a strand 21 by means of the gathering roller 14. The strand 21 is then taken up on the take-up tube of the take-up device 15. Meanwhile, when the strand 21 runs on the sizing agent application roller and guides, so that the glass fibers are superposed on each other to provide a flat cross-section of the strand 21. It is thus possible to produce a flat strand from glass fibers each having a non-circular cross-section.

Figure 5:
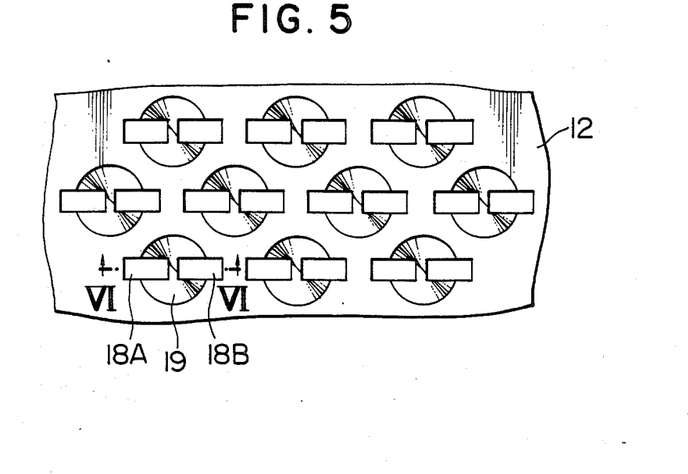
FIG. 5 is an illustration of a part of the bottom; of a nozzle plate 12 shown in FIG. 3.
Figures 6, 7, 8:
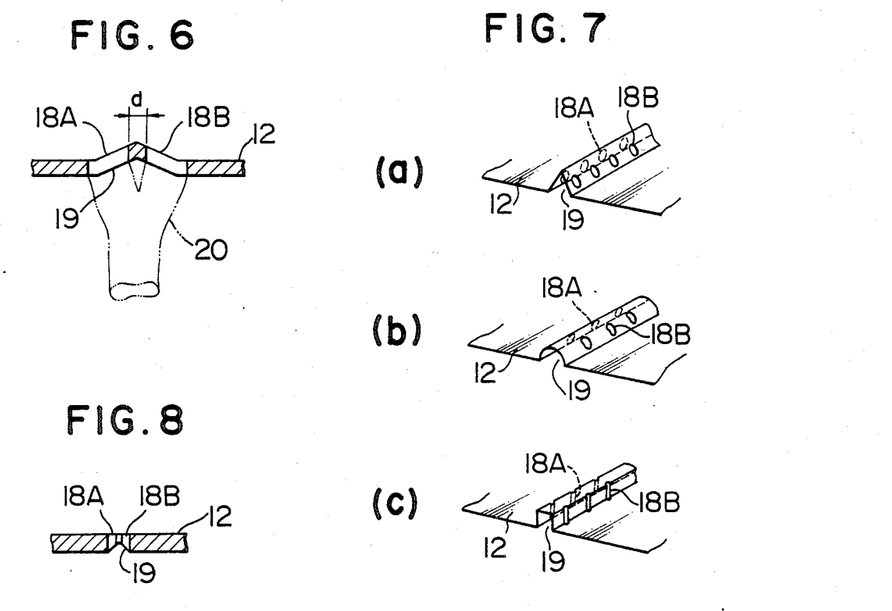
FIG. 6 is a sectional view taken along the line VI—VI of FIG. 5.
FIG. 7 is a perspective view of modifications of the nozzle plate.
FIG. 8 is a sectional view of another modification of the nozzle plate.

The described method of the invention for producing a flat glass fiber of a non-circular cross-section can be carried out effectively, provided that the following conditions are met. The molten glass spun from the nozzle ports generally exhibits a low viscosity and a large surface tension and, therefore, tends to be rounded immediately such as to have a circular cross-section. This applies also to the cocoon cross-sectioned glass fiber formed by adjoining two filaments spun from the pair of nozzle ports 18A, 18B. Namely, the cocoon-shaped cross-section tends to change into oval, elliptic or even to a circular form due to the surface tension, until the glass is solidified. This tendency is noticeable particularly when the distance between the pair of nozzle ports 18A and 18B is small. On the other hand, a too large distance between adjacent nozzle ports makes it difficult to adjoin two glass filaments, with a result that a pair of glass fibers having circular cross-sections are formed. It is, therefore, essential that the distance between two nozzle ports is determined on the basis of the spinning condition such that the product glass fiber after adjoining does not have circular cross-section nor the two discrete filaments are formed. The lower surface of the nozzle plate 12 may be flat. It is, however, preferred that the lower surface of the nozzle plate 12 has recesses 19 in which the pair of nozzle ports 18A and 18B are formed, because in such a case two molten glass filaments are adjoined to each other at a point above the level of the lower surface of the nozzle plate, where the cooling effect by the ambient air is weakened to allow an easy adjoining of the molten glass. In other words, the provision of the recesses 19 permits an increase in the distance between the pair of nozzle ports 18A and 18B, which in turn permits an elongation of the cross-section of the product glass fiber. The spherical and conical form of the recess 19 is not exclusive and the recess 19 may have other forms such as channel-like forms as shown in parts (a), (b) and (c) of FIG. 7. The recesses 19 can be formed by cutting the lower surface of the nozzle plate 12 as illustrated in FIG. 8, instead of deforming this nozzle plate 12 as in the described embodiment. The nozzle ports 18A, 18B can have various cross-sections such as an oval, elliptic or circular cross-section, as well as rectangular cross-section as shown in FIG. 5. It is, however, preferred that the nozzle ports 18A, 18B have an elongated cross-section such as the rectangular cross-section shown in FIG. 5 or an oval cross-section such that the longitudinal axes of both ports are aligned with each other, because such an arrangement permits an easy production of a glass fiber having an elongated cross-section and, hence, a greater specific area of the product glass fiber. With the nozzle plate as shown in FIGS. 5 and 6, it was confirmed that the distance between the pair of nozzle ports 18A and 18B (clearance "d") is preferably selected to range between 0.1 mm and 1 mm. When this clearance d is smaller than 0.1 mm, the cross-section of the product glass fiber tends to become circular, whereas, when the clearance d exceeds 1 mm, the product glass fiber tends to be divided into two discrete filaments.

The cooling gas from the cooling gas blowing device 16 serves to rapidly cool the glass filaments spun from the nozzle ports, thus promoting the solidification. The application of the cooling gas, therefore, is an effective measure for forming a glass fiber having a non-circular cross-section, particularly a cocoon-shaped cross-section, because it prevents the cocoon cross-sectioned molten glass spun from two nozzle ports from becoming circular by the force of the surface tension. The cooling gas may be air or nitrogen, although other types of gas such as an inert gas can be used if the use of such a gas is allowed from the view point of cost. Although in the illustrated embodiment the cooling gas blowing device employs independent gas blowing pipes 25 for respective nozzle port pairs, this arrangement is not exclusive and the gas blowing device can have a single or a few number of cooling gas pipes of a greater cross-sectional area. The angle at which the cooling gas impinges upon the nozzle plate can be selected freely, within a range between the direction parallel to the nozzle surface and the direction perpendicular to the same. Preferably, however, the cooling gas is directed at an angle between 75° and 85° to the nozzle surface. When the air is directed at an angle smaller than the range mentioned above, there is a risk that the flow of the glass fibers is disturbed if the gas is blown only in one direction. In such a case, therefore, the cooling gas is blown from two opposite directions with a good balance of force of the cooling gas. The rate of blowing of the cooling gas preferably ranges between 10 ml/min and 2 l/min for each pair of nozzle ports. A cooling gas blowing rate below 10 ml/min cannot provide the required cooling effect, whereas a cooling gas blowing rate exceeding 2 l/min may cause a disturbance in the flow of the glass fibers, often resulting in troubles such as entanglement of the fibers or separation to filaments having a circular cross-section. Needless to say, the cooling gas blowing device 16 may be omitted provided that the non-circular cross-section of the product glass fiber can be obtained without the cooling gas.

For the purpose of preventing the non-circular cross-section of the spun filament of molten glass from changing into a circular form, it is also an effective measure to increase the viscosity of the glass by lowering the molten galss temperature. A mere increase in the viscosity, however, decreases the spinning rate and undesirably reduces the size of the product glass fiber. It is, therefore, preferred that the molten glass in the bushing is pressurized by a suitable means so that the molten glass is forcibly extruded. This permits the spinning at higher viscosity of the molten glass, and further restrains the tendency for the cross-section of the glass fiber to become circular. Thus, the cocoon cross-sectioned glass fiber produced by this method can have more distinctive expanded and contracted portions. Obviously, a higher the pressure applied to the molten glass permits the spinning of glass filaments having higher viscosity. Although such a high viscosity is desirable from the view point of easiness of formation of glass fibers having non-circular cross-section, the pressure applicable to the molten glass is limited by the strength of the bushing. Thus, the pressure is preferably below 8 kg/cm$^2$.

The described apparatus employs a nozzle plate having a plurality of pairs of nozzle ports and the molten glass filaments spun from two nozzle ports are adjoined to each other to form a single glass fiber of a non-circular cross-section. The glass fiber of the invention having a non-circular cross-section, however, can be formed from three or more glass fiber filaments which are spun from three or more nozzle ports arranged in close proximity of one another.

Figure 9:
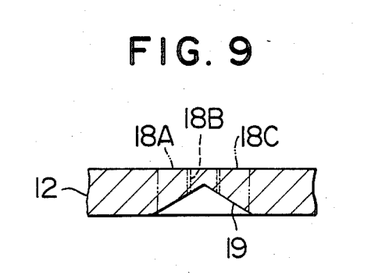
FIG. 9 is a sectional view of a part of a nozzle plate which is used in the production of a glass fiber having a substantially triangular cross-section.
Figure 10:
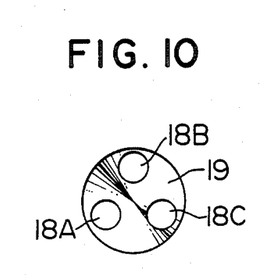
FIG. 10 is a bottom plan view of the nozzle plate shown in FIG. 9.

More specifically, referring to FIGS. 9 and 10, three nozzle ports 18A, 18B and 18C, each having a circular cross-section, are arranged at apices of a regular triangle, in each of conical recesses 19 formed in the lower surface of the nozzle plate 12. Using this nozzle plate, it is possible to obtain a glass fiber having a substantially triangular cross-section, by adjoining the glass filaments spun from three nozzle ports. By a suitable adjustment of amount of deformation of the glass fiber constituted by the glass filaments spun from three nozzle ports, it is possible to obtain a triangular cross-section with recesses in respective sides as shown in FIG. 1B or with straight or outwardly expanded sides. The number of the nozzle ports arranged in the close proximity of one another may be increased to 4, 5 and more, so that glass fibers of various non-circular cross-sections such as square, pentagonal and other polygonal shapes can be obtained. In each of these cases, the nozzle port can have any desired cross-section such as rectangular, oval, elliptic or other shapes, as well as a circular cross-section. It is not essential that the nozzle ports are positioned at the apices of the polygon. By varying the positions of the nozzle ports, it is possible to obtain various non-circular cross-sectional shapes of the product glass fiber.

EXAMPLE I

Figure 11:
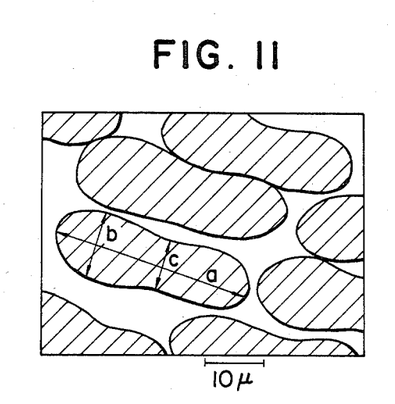
FIG. 11 is a sectional view drafted on the basis of a microscopic photograph of the cross-section of a glass fiber produced in accordance with an embodiment I of the method of the invention.

Glass fibers were produced by using nozzle plates having nozzle ports 18A, 18B and recesses 19 of the size and shape as shown in Table 1 and FIGS. 5 and 6. The sizes and cross-section of the thus formed glass fiber are shown in Table 1 and FIG. 11. A rod formed as a pultrusion was produced from a strand which was prepared by gathering the glass fibers of this Example. The rod showed a tensile strength which is about 10 to 15% higher than that of the conventional strand prepared from glass fibers having a circular cross-section.

TABLE 1

| | |
|---|---|
| Shape of nozzle port: | rectangular |
| Nozzle longer side length: | 2.5 mm |
| Nozzle shorter side length: | 1.1 mm |
| Molten glass temperature: | 1240° C. |
| Spinning pressure: | Normal (glass head pressure) |
| Cooling gas blowing rate: | 0.5 ml/min/pair |
| Cooling gas blowing angle: | 75° |
| Cooling gas pipe diameter: | 2 mm |
| Filament longer diameter (a): | 30μ |
| Filament shorter diameter (b): | 10μ |
| Filament center diameter (c): | 0.9 to 0.8 × b |

EXAMPLE II

Figure 12:
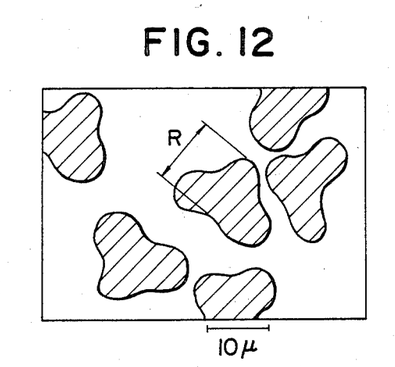
FIG. 12 is a sectional view drafted on the basis of a microscopic photograph of the cross-section of a glass fiber produced in accordance with the embodiment II of the method of the invention.

Glass fibers were produced by using a nozzle plate having nozzle ports 18A, 18B, 18C and recesses 19 of the shapes and sizes as shown in Table 2 and FIGS. 9 and 10. The size and the cross-section of the thus produced glass fiber are shown in Table 2 and FIG. 12. The thus formed glass fibers are gathered into a strand which was then subjected to an FRTP test for measuring the flexural strength, and showed 10 to 15% increase in the flexural strength over the known strand produced from ordinary glass fibers having circular cross-section.

TABLE 2

| | |
|---|---|
| Nozzle shape: | circular |
| Nozzle position: | apices of triangle |
| Nozzle diameter: | 1.6 mm |
| Molten glass temperature: | 1200° C. |
| Spinning pressure: | normal (glass head pressure) |
| Cooling gas blowing rate: | 0.5 l/min/recess |
| Cooling gas blowing angle: | 75° |
| Cooling gas blowing pipe diameter: | 2 mm |
| Diameter of recess 19: | 4 mm |
| Filament diameter (R): | 10μ |

Figure 13:
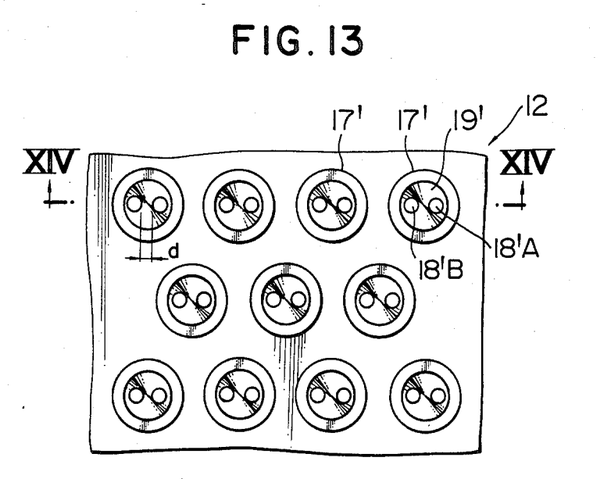
FIG. 13 is a bottom plan view of a part of another example of the nozzle plate used in the apparatus shown in FIG. 3.
Figure 14:
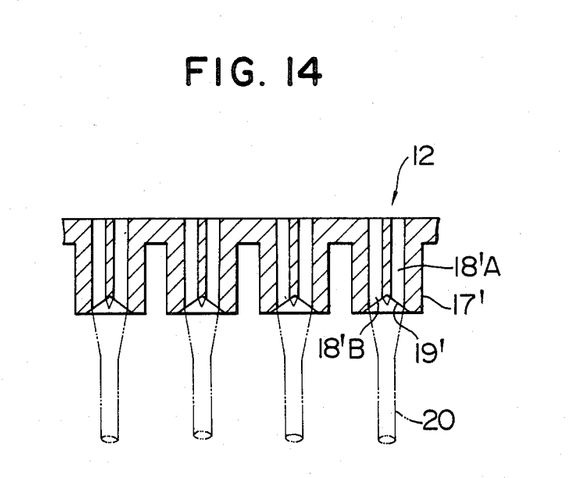
FIG. 14 is a sectional view taken along the line XIV—XIV of FIG. 13.

FIGS. 13 and 14 show another example of the nozzle plate 12 suited for use in the glass fiber production apparatus shown in FIGS. 3 and 4. In this case, the nozzle plate 12 is provided on the lower side thereof with a plurality of tips projecting downwardly therefrom. This nozzle plate 12 permits the molten glass in the bushing 11 to be maintained at a higher temperature than in the case where the nozzle plate has no tip, so that the undesirable devitrification of the molten glass can be avoided advantageously.

When the nozzle plate having tips is used, the molten glass starts to flow through the nozzle ports and tentatively stagnates on the lower end surface of each tip. The molten glass then flows vertically downwardly by the force of gravity, without spreading laterally, so that the arraying of filaments at the time of commencement of the spinning can be facilitated. In addition, even when the filament is cut accidentally during the spinning, the molten glass constituting the cut filament does not flow laterally into the adjacent tips, whereby the cutting of adjacent filaments is avoided.

The lower end of the tip 17' formed on the lower side of the nozzle plate 12 may be flat. It is, however, preferred that the end surface of the tip 17' is recessed as at 19' as shown in FIGS. 13 and 14. In such a case, the molten glass filaments spun from two nozzle ports 18'A, 18'B in the same tip 17' can merge in each other at a point which is above the lower end surface of the tip 17', so that the cooling effect produced by the ambient air is weakened so as to permit an easy merging of two molten glass filaments spun from two nozzle ports. In other words, the provision of the recess 19' permits an increase in the distance between the nozzle ports 18'A and 18'B, thus enabling the production of glass fibers having further elongated cross-sections. In the nozzle plate as shown in FIGS. 13 and 14, the clearance "d" between adjacent nozzle ports 18'A and 18'B of each pair is preferably selected to range between 0.1 mm and 1 mm. When the clearance "d" is smaller than 0.1 mm, the glass fiber tends to have a circular cross-section, whereas, when the clearance "d" exceeds 1 mm, the glass fiber tends to be divided into two discrete filaments.

The temperature of the molten glass spun from the nozzle ports is made as low as possible, without causing any impediment to the spinning operation. When the temperature of the spun glass is low, the glass exhibits a higher viscosity and, hence, exhibits a greater tendency for preventing the cross-section of the product glass fiber from becoming circular, thus assuring the non-circular cross-section of the product glass fiber. The tips 17' provided on the lower surface of the nozzle plate 12 produce a cooling effect for cooling the molten glass flowing through the tips 17'. The temperature of the molten glass in the furnace, therefore, is set at a level which is considerably high as compared with the spinning temperature, i.e., the molten glass temperature at the end of the tip. Therefore, the molten glass temperature does not come down to a level at which devitrification takes place, even when there is a slight variation in the temperature of the glass in liquid phase within the furnace, so that a stable operation becomes possible.

The tip 17' preferably has a large length so that it can have a greater cooling effect. A too large length of the tip, however, tends to cause problems such as an increased flow resistance or too complicated construction. As stated before, the tip 17' serves also to prevent the molten glass from spreading laterally along the surface of the nozzle plate. To enjoy this advantage, the tip preferably has a large length. Taking all these facts into account, the tip length preferably ranges between 1 and 5 mm, preferably 3 mm.

FIGS. 13 and 14 show an example of the tip-equipped nozzle plate which can be used in carrying out the method of the invention. This nozzle plate, however, can be modified in various forms. For instance, the tips 17' may be arranged along regular rows and columns, instead of being arranged in a staggered form as shown in FIG. 13. The construction of the tip 17' also may be varied in various ways. For instance, a tip 17'A shown in FIG. 15A has a large bore 26 under which are formed the pair of nozzle ports 18'a, 18'b, while a tip 17'B formed in FIG. 15B is provided at its top end with an entrance recess 27 and at its bottom end with a recess 19'a constituted by a cylindrical bore and a conical recess. FIG. 15C shows still another example in which the tip 17'C has a large bore 28 followed by a pair of nozzle ports 18'c, 18'd inclined such as to converge downwardly, with the lower tip end surface maintained flat.

Figure 16:
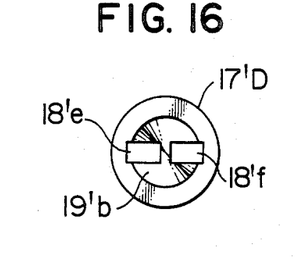
FIGS. 16 and 17 are bottom plan views showing different modifications of the tips of the nozzle plate.

The nozzle port can have any desired cross-sectional shape such as rectangular, oval, elliptic and other shapes. FIG. 16 shows an example in which the tip 17'D is provided with a bottom recess 19'b and a pair of rectangular nozzle ports 18'e, 18'f which are arranged with their longitudinal axis aligned with each other.

Figure 18:
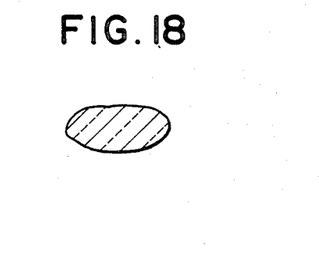
FIG. 18 is a sectional view of a glass fiber having an elliptic cross-section, produced in accordance with the method of the invention.

With this arrangement, it is possible to produce a glass fiber having an elongated cross-section with a large specific area. For instance, the glass fiber having cross-sectional shapes shown in FIGS. 1A and 18 can be produced by using a nozzle plate having tips 17'D shown in FIG. 16.

Although in the described examples only two nozzle ports are formed in each tip, this is not exclusive and the invention does not exclude three or more nozzle ports formed in each tip, in such a manner that the filaments of molten glass spun from these nozzle ports are adjoined to one another to form a single glass fiber having a non-circular cross-section.

Figure 17:
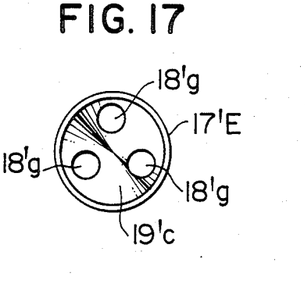

FIG. 17 shows an example in which each tip 17'E has three nozzle ports 18'g each having a circular cross-section arranged on apices of a regular triangle. These three nozzle ports 18'g open in a conical recess 19'c.

Using the nozzle plate having the tips 17'E, glass fibers each having a substantially triangular cross-section were produced, by adjoining the molten glass filaments from three nozzle ports into a single glass fiber within each tip. By a suitable adjustment of amount of deformation of the glass fiber constituted by the glass filaments spun from three nozzle ports, it is possible to obtain a triangular cross-section with recesses in respective sides as shown in FIG. 1B or with straight or outwardly expanded sides. The number of the nozzle ports arranged in the close proximity of one another may be increased to 4, 5 and more, so that glass fibers of various non-circular cross-sections such as square, pentagonal and other polygonal shapes can be obtained. In each of these cases, the nozzle port can have any desired cross-section such as rectangular, oval, elliptic or other shapes, as well as a circular cross-section. It is not essential that the nozzle ports are positioned at the apices of the polygon. By varying the positions of the nozzle ports, it is possible to obtain various non-circular cross-sectional shapes of the product glass fiber.

EXAMPLE III

Figure 15A:
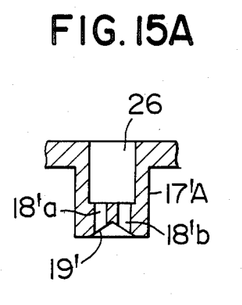
FIGS. 15A, 15B and 15C are sectional views of modifications of tips on the nozzle plate used in the method of the invention.
Figure 15B:
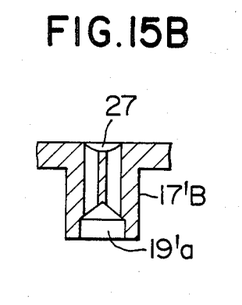
Figure 15C:
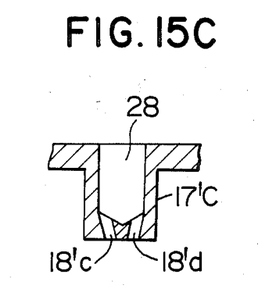

Glass fibers were produced by using the nozzle plate (Experiments 1 and 2) having tips as shown in FIGS. 13 and 14, as well as a nozzle plate (Experiment 3) having tips as shown in FIG. 15A. For the purpose of comparison, glass fibers were produced also with a flat nozzle having no tip. The conditions of the production of the glass fibers, as well as data such as the shapes and sizes of the product glass fibers, are shown in Table 3. In all cases, the cooling by cooling gas was not conducted. From Table 3, it will be seen that Example III of the nozzle plate permits the molten glass temperature in the furnace to be maintained at a higher level than the case where the flat nozzle plate is used, thus enabling a remarkable reduction in the time required for the arraying of the glass fibers.

TABLE 3

|  | Experiment 1 | Experiment 2 | Experiment 3 | Comparison Experiment |
|---|---|---|---|---|
| Types of nozzle plate | With tips | With tips | With tips | Flat |
| Tip shape | FIG. 14 | FIG. 14 | FIG. 15A | |
| Tip length (mm) | 3 | 3 | 3 | 0 |
| Nozzle port shape | Circular | Circular | Circular | Circular |
| Number of nozzle ports in each tip | 2 | 2 | 2 | 2 |
| Nozzle diameter | 1.6 | 1.5 | 1.5 | 1.5 |

TABLE 3-continued

| | Experiment 1 | Experiment 2 | Experiment 3 | Comparison Experiment |
|---|---|---|---|---|
| (mm) | | | | |
| Number of nozzle ports | 200 | 200 | 200 | 200 |
| Diameter of recess (mm) | 4 | 4 | 4 | 4 |
| Molten glass temperature in furnace (°C.) | 1210 | 1220 | 1200 | 1145 |
| Spinning pressure | Normal | Normal | Normal | Normal |
| Arraying time | 3.5 min. | 4 min. | 2 min. | 20 min. |
| Filament shape | Elliptic | Elliptic | Elliptic | Elliptic |
| Longer diameter (μ) | 19.1 | 17.3 | 20.5 | 19.0 |
| Shorter diameter (μ) | 6.4 | 5.8 | 6.8 | 6.4 |

As will be understood from the foregoing description, according to the invention, molten glass filaments spun from a plurality of nozzle ports are adjoined to each other to form a single glass fiber, so that the tendency for the cross-section of the glass fiber after adjoining to become circular is suppressed, thus allowing fabrication of glass fibers having various non-circular cross-sections such as oval, elliptic, cocoon-shaped and polygonal shapes. In a specific embodiment of the invention, the nozzle plate is provided on the lower side thereof with a plurality of tips in which are formed the plurality of nozzle ports. In such a case, the undesirable lateral flow of the molten glass from one to the adjacent tip does not take place, so that the glass fibers are arrayed quickly when starting the spinning operation or during the recovery after an accidental cutting of the glass fiber during spinning. Furthermore, the tip produces a suitable cooling effect so as to permit the temperature of the molten glass in the furnace to be maintained at a level which is high enough to prevent any devitrification of the glass, thus ensuring the stable and safe spinning operation.

What is claimed is:

1. A method of producing a glass fiber strand comprising: maintaining glass in a melt zone having a nozzle plate defining the bottom of said zone, said nozzle plate having a multiplicity of recesses in the lower surface thereof each having a set of spaced nozzle ports, said set of nozzle ports being in close proximity with one another and arrranged symmetrically with respect to the center of said recess; flowing the molten glass from said melt zone through flow paths defined by said nozzle ports, each of said recesses being configured so that the flow path of the nozzle port remote from the center thereof is longer than the flow path of the nozzle port near the center thereof; withdrawing glass filaments from said nozzle ports and fusing together the contiguous surfaces of the glass filaments exiting from each set of nozzle ports at a point towards the center of and below the recess in the nozzle plate to form single glass fibers; cooling the non-contiguous portions of the glass filaments so as to prevent the single glass fibers from assuming circular cross-sections; and gathering said glass fibers into a strand.

2. A method for producing a glass fiber strand according to claim 1 wherein each recess has a pair of nozzle ports each having a circular cross-section.

3. A method of producing a glass fiber strand comprising: maintaining glass in a melt zone having a nozzle plate defining the bottom of said zone, said nozzle plate having a multiplicity of downwardly extending projections on the underside thereof and each of said projections having a recess in the lower surface thereof, and each recess having a set of spaced nozzle ports, said set of nozzle ports being in close proximity with one another and arranged symmetrically with respect to the center of said recess; flowing the molten glass from said melt zone through flow paths defined by said nozzle ports, each of said recesses being configured so that the flow path of the nozzle port remote from the center thereof is longer than the flow path of the nozzle port near the center thereof; withdrawing glass filaments from said nozzle ports and fusing together the contiguous surfaces of the glass filaments exiting from each set of nozzle ports at a point towards the center of and below the recess to form single glass fibers; cooling the non-contiguous portions of the glass filaments so as to prevent the single glass fibers from assuming circular cross-sections; and gathering said glass fibers into a strand.

4. A method of producing a glass fiber strand according to claim 3 wherein each of said projections contains a pair of nozzle ports each having a circular cross-section.

5. A method of producing a glass fiber strand according to claim 3, wherein each of said tip contains a pair of nozzle ports.

6. A method of producing a glass fiber strand according to claim 3, wherein each of said tip contains a pair of nozzle ports each having a rectangular cross-section, said nozzle ports being arranged such that the longitudinal axes thereof are aligned with each other.

7. A method of producing a glass fiber strand according to claim 1, wherein said recess has a conical form.

8. A method of producing a glass fiber strand according to claim 1, wherein said recess has the form of a part of a sphere.

9. A method of producing a glass fiber strand according to claim 1, wherein said recess has a channel-like form.

10. A method of producing a glass fiber strand according to claim 1, wherein said plurality of nozzle ports include a pair of rectangular nozzle ports arranged such that their longitudinal axes are aligned with each other.

11. A method of producing a glass fiber strand according to claim 1, wherein said plurality of nozzle ports include a pair of oval nozzle ports arranged such that their longitudinal axes are aligned with each other.

12. A method of producing a glass fiber strand according to claim 1, wherein said plurality of nozzle ports include three nozzle ports arranged at apices of a triangle.

13. A method of producing a glass fiber strand according to claim 1, wherein said plurality of nozzle ports include three nozzle ports having a circular cross-section and arranged at respective apices of a triangle.

14. A method of producing a glass fiber strand according to claim 3, wherein each tip contains three nozzle ports which are arranged at apices of a triangle.

15. A method of producing a glass fiber strand according to claim 3, wherein each said tip is provided at the lower end surface with a recess and said plurality of nozzle ports are arranged in said recess formed in the lower end surface of said each tip such as to partially open in said recess, said nozzle ports in each recess being arranged in symmetry with respect to the center of said recess.

16. A method of producing a glass fiber strand according to claim 15, wherein said recess has a conical form.

17. A method of producing a glass fiber strand according to claim 15, wherein said recess has the form of a part of a sphere.

18. A method of producing a glass fiber strand according to claim 3, wherein each said tip has a bore of a comparatively large diameter and communicating at its lower end with said plurality of nozzle ports.

19. A method of producing a glass fiber strand according to claim 3, wherein said nozzle ports are separated from each other over the entire length of said tip.

20. A method of producing a glass fiber strand according to claim 3, wherein said nozzle ports formed in each of said tip are inclined such as to converge downwardly.

* * * * *